United States Patent
Yu et al.

(10) Patent No.: US 9,988,996 B2
(45) Date of Patent: Jun. 5, 2018

(54) METHOD OF CONTROLLING SUPERCHARGER

(71) Applicant: Hyundai Motor Company, Seoul (KR)

(72) Inventors: Seung Eun Yu, Seoul (KR); Young Ho Kim, Hwaseong-si (KR); Hyo Sang Cho, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 92 days.

(21) Appl. No.: 15/155,424

(22) Filed: May 16, 2016

(65) Prior Publication Data

US 2017/0096952 A1   Apr. 6, 2017

(30) Foreign Application Priority Data

Oct. 6, 2015   (KR) .................. 10-2015-0140389

(51) Int. Cl.
*F02D 41/00* (2006.01)
*F02B 37/14* (2006.01)
(Continued)

(52) U.S. Cl.
CPC .......... *F02D 41/0007* (2013.01); *F02B 33/40* (2013.01); *F02B 37/04* (2013.01); *F02B 37/14* (2013.01); *F02B 39/10* (2013.01); *F02D 41/1401* (2013.01); *F02D 2041/141* (2013.01); *F02D 2200/0406* (2013.01); *F02D 2200/101* (2013.01); *F02D 2200/503* (2013.01);
(Continued)

(58) Field of Classification Search
CPC ............. F02D 41/0007; F02D 41/1401; F02D 2041/141; F02D 2200/101; F02D 2200/503; F02D 2200/602; F02D 2200/703; F02D 2200/0406; F02B 37/14; F02B 39/10; F02B 33/40; F02B 37/04; Y02T 10/144
USPC .................. 60/605.2, 612; 417/213; 701/102
See application file for complete search history.

(56) References Cited

U.S. PATENT DOCUMENTS 4,901,530 A    2/1990  Kawamura
7,210,296 B2 * 5/2007  Bolz ...................... F02B 37/04
                                                            60/598
(Continued)

FOREIGN PATENT DOCUMENTS

JP    2005-214153        8/2005
JP    2006-348831 A     12/2006
KR   10-2003-0032521     4/2003

*Primary Examiner* — Hoang Nguyen
(74) *Attorney, Agent, or Firm* — Brinks Gilson & Lione

(57) ABSTRACT

A method of controlling a supercharger includes: an information conversion step, a map deducing step, a boost amount deducing step, and a RPM deducing step. In the information conversion step, a sensor detects information of a vehicle, and a control unit converts the information into a factor and saves. The map deducing step includes deducing a total boost amount for driving an engine, and deducing a map for a target boost amount of a supercharger using a boost pressure of a turbocharger. A correction value deduced in the boost amount deducing step is calculated according to vehicle environment information, and a target RPM of the supercharger is calculated based on the target boost amount of the supercharger, and a boost pressure by the supercharger. In particular, the target boost amount of the supercharger is deduced based on the correction value, the converted factor, and the deduced map.

6 Claims, 2 Drawing Sheets

(51) Int. Cl.
  *F02D 41/14*   (2006.01)
  *F02B 33/40*   (2006.01)
  *F02B 37/04*   (2006.01)
  *F02B 39/10*   (2006.01)

(52) U.S. Cl.
  CPC .. *F02D 2200/602* (2013.01); *F02D 2200/703* (2013.01); *Y02T 10/144* (2013.01)

(56) References Cited

U.S. PATENT DOCUMENTS

| | | | |
|---|---|---|---|
| 9,303,554 B2* | 4/2016 | Mizuno | F02B 37/10 |
| 9,482,149 B2* | 11/2016 | Barker | B60W 10/06 |
| 2003/0024499 A1* | 2/2003 | Umezono | F02B 31/085 |
| | | | 123/301 |
| 2004/0194465 A1* | 10/2004 | Bolz | F02B 37/04 |
| | | | 60/612 |
| 2013/0090832 A1* | 4/2013 | Bevan | F02B 37/04 |
| | | | 701/102 |

* cited by examiner

METHOD OF CONTROLLING SUPERCHARGER

CROSS REFERENCE TO RELATED APPLICATION

The present application claims priority to and the benefit of Korean Patent Application No. 10-2015-0140389, filed on Oct. 6, 2015, which is incorporated herein by reference in its entirety.

FIELD

The present disclosure relates to a method of controlling a supercharger to drive an engine in desired conditions.

BACKGROUND

The statements in this section merely provide background information related to the present disclosure and may not constitute prior art.

In general, a vehicle includes a turbocharger and a supercharger in order to increase engine power. The turbocharger is a device that rotates a turbine using the pressure and thermal energy of exhaust gas generated during the explosion stroke of an engine and rotates an impeller on the same rotary shaft therewith, thereby enabling air introduced through an air cleaner to be sucked into the combustion chamber of the engine for increasing an air filling ratio through the supercharging of the sucked air, and thus achieving an improvement in engine power and a reduction in exhaust gas. In addition, the supercharger is a device that enables air introduced through an air cleaner to be sucked into a combustion chamber, by means of using the power of a motor or an engine, for increasing an air filling ratio through the supercharging of the sucked air, similarly to the turbocharger.

When the turbocharger and the supercharger are mounted and used in the vehicle, engine power may be increased over several dozen % by the increased amount of air in the engine of the same displacement. However, the turbocharger has a turbo lag phenomena in that a smaller quantity of air than that in a naturally aspirated engine flows into the combustion chamber in a low-speed and low-load operating region. In the low-speed and low-load operating region, the energy of exhaust gas is low due to the characteristics of the turbocharger, i.e. the turbocharger brings about a turbo lag.

SUMMARY

The present disclosure proposes a method of controlling a supercharger, capable of improving responsiveness to momentary variation in target boost amount of a supercharger by detecting a variation in engine operating condition and thus controlling the supercharger.

In one form, a method of controlling a supercharger includes: an information conversion step of collecting information in a control unit, desired for vehicle driving detected by a detection means, and converting the collected information into a factor; a map deducing step of deducing a total boost amount desired for driving of an engine, based on the information collected in the control unit, and deducing a map for a target boost amount of a supercharger through a relationship with a boost pressure of a turbocharger; and a boost amount deducing step of deducing a correction value, according to vehicle environment information input to the control unit, in the control unit, wherein the target boost amount of the supercharger is deduced based on the deduced correction value, the factor converted from the collected information, and the map deduced from the deducing a total boost amount; and a RPM deducing step of deducing a target RPM of the supercharger, based on the target boost amount of the supercharger deduced from the deduced correction value, and a boost pressure by the supercharger.

In the information conversion step, the control unit may collect the information detected by the detection means, deduce each variation in the information over a time, and convert the deduced variation into a corresponding factor.

The information conversion step may include converting the factor, converted from the collected information, into a target boost correction value of the supercharger.

In the boost amount deducing step, the correction value may be deduced according to information such as one or more of a battery voltage, an atmospheric temperature, an atmospheric pressure, and a coolant temperature, which are input to the control unit.

In the RPM deducing step, the target RPM of the supercharger may be deduced using a PID controller.

In accordance with another aspect of the present disclosure, a method of controlling a supercharger includes: by means of a controller, detecting information desired for vehicle driving using a detection means to convert a variation of the detected value to a time into a factor, deducing a total boost amount desired for driving of an engine, based on the value detected by the detection means, to deduce a map for a target boost amount of a supercharger through a relationship with a boost pressure of a turbocharger, deducing a correction value to vehicle environment information to deduce a target boost amount of the supercharger, based on the factor, the map, and the correction value, and deducing a target RPM of the supercharger according to a boost pressure by the supercharger.

As apparent from the above description, in accordance with a method of controlling a supercharger, a supercharger can have improved responsiveness to momentary variation in target boost amount thereof and launching performance when a vehicle is accelerated can be enhanced by an improvement in responsiveness of the supercharger, by detecting variations in engine RPM and load and controlling the RPM of the supercharger according to a variation in engine operating condition, using a three-dimensional logic in which a time axis is added to a conventional map-based control logic.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
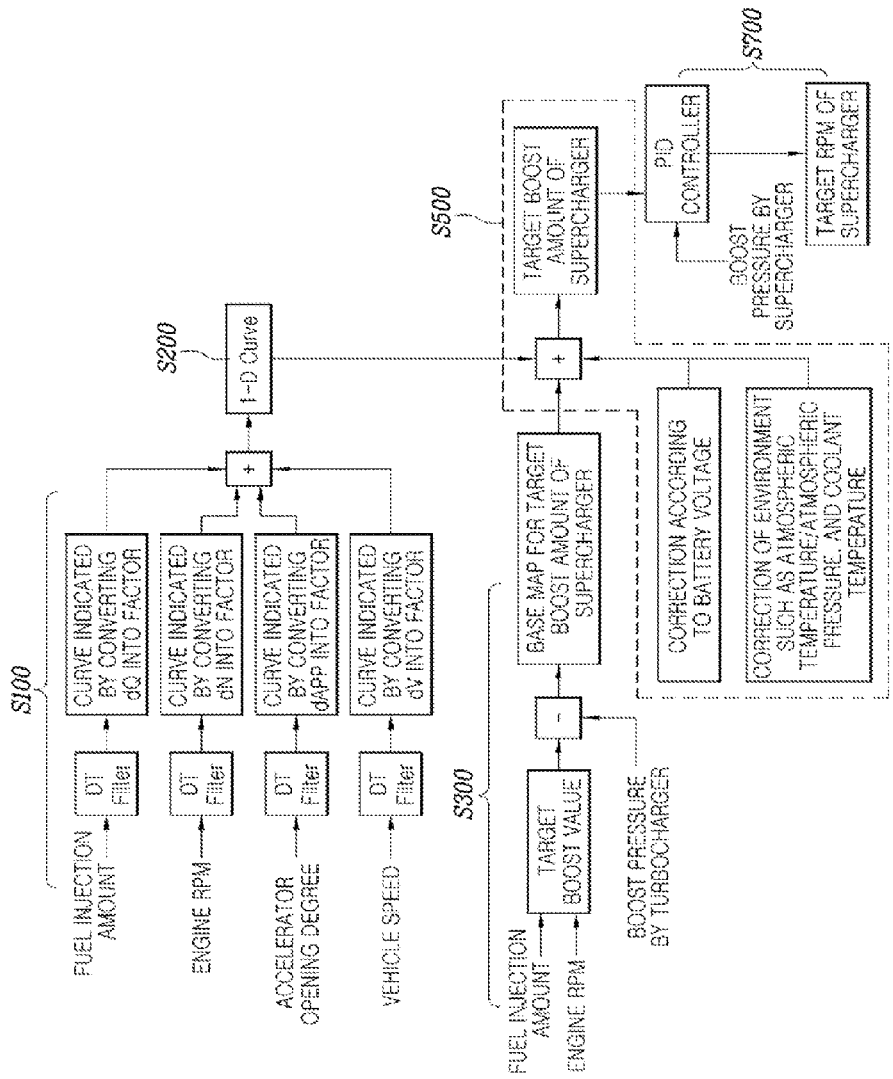
FIG. 1 is a diagram illustrating a method of controlling a supercharger.
Figure 2:
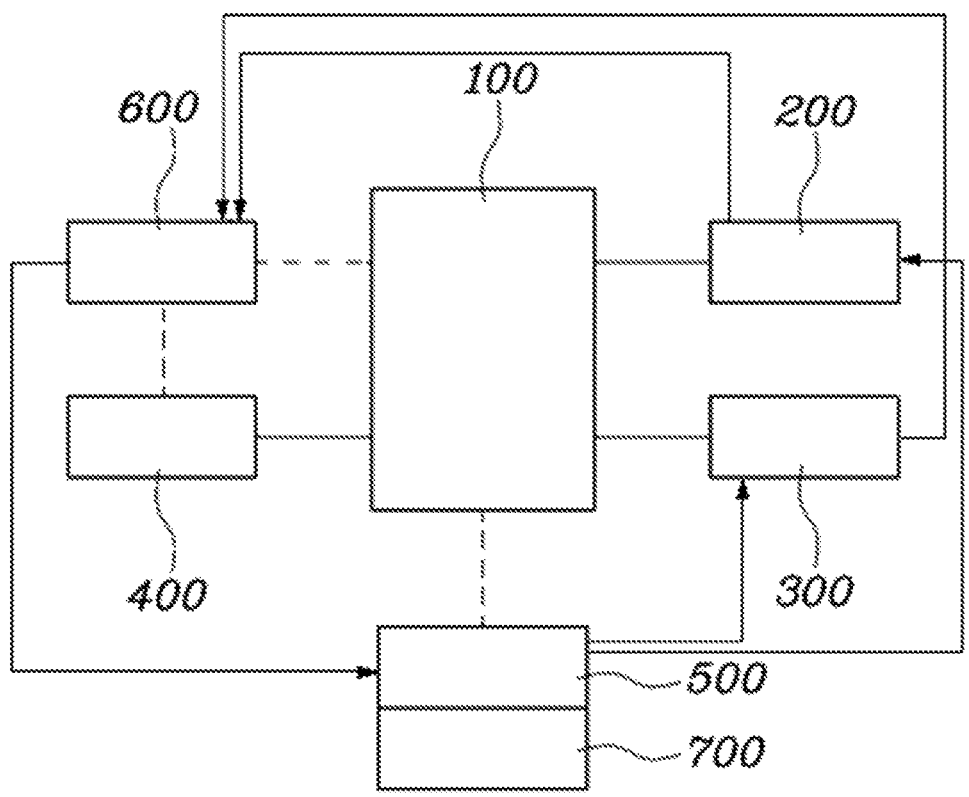
FIG. 2 is a block diagram illustrating components in the method of FIG. 1.

The following description is merely exemplary in nature and is not intended to limit the present disclosure, applica- FIG. 1 is a diagram illustrating a method of controlling a supercharger according to one form of the present disclosure. FIG. 2 is a block diagram illustrating components in the method of FIG. 1.

The method of controlling a supercharger according to the present disclosure includes: an information conversion step (S100) of collecting information, desired for vehicle driving detected by a detection means 600, in a control unit 500, and of converting the collected information into factors; a map deduction step (S300) of deducing a total boost amount desired for the driving of an engine 100, based on the information collected in the control unit 500, and of deducing a map for a target boost amount of a supercharger 300 through a relationship with the boost pressure of a turbocharger 200; a boost amount deduction step (S500) of deducing correction values, according to vehicle environment information input to the control unit 500, in the control unit 500, and of deducing a target boost amount of the supercharger 300, based on the deduced correction values, the factors deduced from the information conversion step (S100), and the map deduced from the map deduction step (S300); and an RPM deduction step (S700) of deducing a target RPM of the supercharger 300, based on the target boost amount of the supercharger 300 deduced from the boost amount deduction step (S500) and the boost pressure by the supercharger 300.

In the information conversion step (S100), when the engine 100 of the vehicle begins to be driven, the detection means 600 detects information such as a fuel injection amount, an engine RPM, an accelerator opening degree, and a vehicle speed. Thus, the detection means 600 may be a sensor for detecting each of them, for example, a fuel injection sensor, a crankshaft position sensor, an accelerator position sensor, etc. The information detected by the detection means 600 is collected in the control unit 500. In the information conversion step (S100), the collected information is converted into factors. Here, the control unit 500 deduces each variation of the information, detected by the detection means 600, over a time, and converts the deduced variation into a factor. Accordingly, the converted factor may be indicated, for example, by the following table.

TABLE 1

| dQ | 0 | 5 | 10 | ... |
|---|---|---|---|---|
| f | 0 | 0.1 | 0.3 | ... |

That is, the vehicle information detected by the detection means 600 is filtered into the variation over the time, and the deduced variation is converted into the factor to be indicated as a curve. The information conversion step (S100) may include a target boost correction value conversion step (S200) of converting the factors converted by the information conversion step (S100) into target boost correction values of the supercharger 300. The sum of factors deduced for the information may be converted into the target boost correction values of the supercharger 300. For example, the converted correction values may be indicated as one-dimensional curve in the following table.

TABLE 2

| F | 0 | 0.2 | 0.4 | ... |
|---|---|---|---|---|
| $P_{add}$ | 0 | 100 | 200 | ... |

In addition, the control unit 500 deduces a total boost amount desired for the driving of the engine 100, based on the fuel injection amount and engine RPM desired for vehicle driving detected by the detection means 600. The map deduction step (S300) is performed to deduce a map for the target boost amount of the supercharger 300 through the relationship between the deduced total boost amount and the boost pressure of the turbocharger 200.

Additionally, the control unit 500 deduces correction values according to vehicle environment information input thereto. The correction values may be deduced according to the environment information such as one or more of a voltage of a battery 400, an atmospheric temperature, an atmospheric pressure, and a coolant temperature, which are input to the control unit 500. Accordingly, the boost amount deduction step (S500) is performed to deduce a target boost amount of the supercharger 300, based on the deduced correction values, the factors deduced from the information conversion step (S100), and the map deduced from the map deduction step (S300).

The information conversion step (S100), the map deduction step (S300), and the boost amount deduction step (S500) may be simultaneously performed, instead of being sequentially performed over time. In addition, the information desired for vehicle driving, which is detected by the detection means 600 and is input to the control unit 500, the environment information, and the correction values are not limited to the above description. For example, they may be changed according to the environment and design of the vehicle, if desired. In addition, the supercharger 300 may be an electric supercharger.

Accordingly, after the boost amount deduction step (S500) is performed, the RPM deduction step (S700) is performed to deduce a target RPM of the supercharger 300, based on the target boost amount of the supercharger 300 deduced from the boost amount deduction step (S500) and the boost pressure by the supercharger 300. Finally, the rotation of the supercharger 300 is controlled through the target RPM of the supercharger 300. In this case, in the RPM deduction step (S700), the target RPM of the supercharger 300 may be deduced using a PID (Proportional-Integral-Derivative) controller 700.

In short, the method of controlling a supercharger is performed by detecting the information desired for vehicle driving using the detection means 600 to convert the variations in the detected values over the time into the factors, deducing the total boost amount desired for the driving of the engine 100, based on the values detected by the detection means 600, to deduce the map for the target boost amount of the supercharger 300 through the relationship with the boost pressure of the turbocharger 200, deducing the correction values to vehicle environment information to deduce the target boost amount of the supercharger 300, based on the factors, the map, and the correction values, and deducing the target RPM of the supercharger 300 according to the boost pressure by the supercharger 300, by means of the controller 700. Finally, the method deduces the target RPM of the supercharger 300 according to the driving of the engine 100 of the vehicle.

Therefore, in accordance with the method of controlling a supercharger, the supercharger can have improved responsiveness to momentary variation in target boost amount thereof and launching performance when the vehicle is accelerated can be enhanced by the improvement in responsiveness of the supercharger, by detecting variations in engine RPM and load and controlling the RPM of the supercharger according to a variation in engine operating condition, using a three-dimensional logic in which a time axis is added to a conventional map-based control logic.

Although the forms of the present disclosure have been disclosed for illustrative purposes, those skilled in the art will appreciate that various modifications, additions and substitutions are possible, without departing from the scope and spirit of the present disclosure.

What is claimed is:

1. A method of controlling a supercharger, comprising: an information conversion step of collecting information for driving a vehicle in a control unit, the information detected by a detection means, and converting the collected information into a factor;
   a map deducing step of deducing a total boost amount desired for driving an engine, based on the collected information in the control unit, and deducing a map for a target boost amount of a supercharger through a relationship with a boost pressure of a turbocharger;
   a boost amount deducing step of deducing a correction value, according to vehicle environment information input to the control unit, in the control unit, wherein the target boost amount of the supercharger is deduced based on the deduced correction value, the factor converted from the collected information, and the map deduced from the deduced total boost amount; and
   a RPM deducing step of deducing a target RPM of the supercharger, based on the target boost amount of the supercharger deduced from the deduced correction value, and a boost pressure by the supercharger.

2. The method according to claim 1, wherein in the information conversion step, the control unit is configured to collect the information detected by the detection means, deduce each variation in the information over a time, and convert the deduced each variation into a corresponding factor.

3. The method according to claim 1, wherein the information conversion step comprises converting the factor, converted from the collected information, into a target boost correction value of the supercharger.

4. The method according to claim 1, wherein in the boost amount deducing step, the correction value is deduced from at least one of a battery voltage, an atmospheric temperature, an atmospheric pressure, or a coolant temperature, which are input to the control unit.

5. The method according to claim 1, wherein in the RPM deducing step, the target RPM of the supercharger is deduced using a PID controller.

6. A method of controlling a supercharger, the method comprising:
   detecting information desired for driving a vehicle driving by a detection means and converting a variation of the detected value over a time into a factor by a controller;
   deducing, by the controller, a total boost amount desired for driving an engine, based on the information detected by the detection means, and deducing a map for a target boost amount of a supercharger using a boost pressure of a turbocharger;
   deducing, by the controller, a correction value to vehicle environment information to deduce the target boost amount of the supercharger, based on the factor, the map, and the correction value; and
   deducing, by the controller, a target RPM of the supercharger according to a boost pressure by the supercharger.

* * * * *